United States Patent
Kuwahara

(10) Patent No.: US 9,340,072 B2
(45) Date of Patent: May 17, 2016

(54) MOTORCYCLE TIRE

(71) Applicant: SUMITOMO RUBBER INDUSTRIES, LTD., Kobe-shi, Hyogo (JP)

(72) Inventor: Takao Kuwahara, Kobe (JP)

(73) Assignee: SUMITOMO RUBBER INDUSTRIES, LTD., Kobe-Shi (JP)

( * ) Notice: Subject to any disclaimer, the term of this patent is extended or adjusted under 35 U.S.C. 154(b) by 552 days.

(21) Appl. No.: 13/796,161

(22) Filed: Mar. 12, 2013

(65) Prior Publication Data
US 2013/0240099 A1 Sep. 19, 2013

(30) Foreign Application Priority Data

Mar. 16, 2012 (JP) ................................. 2012-060708

(51) Int. Cl.
*B60C 11/117* (2006.01)
*B60C 11/03* (2006.01)

(52) U.S. Cl.
CPC ........... *B60C 11/0304* (2013.04); *B60C 11/032* (2013.04); *B60C 11/0302* (2013.04); *B60C 2011/0372* (2013.04); *B60C 2011/0374* (2013.04); *B60C 2200/10* (2013.04)

(58) Field of Classification Search
CPC .................................................. B60C 11/032
USPC .................... 152/209.11; D12/506, 534, 605
See application file for complete search history.

(56) References Cited

U.S. PATENT DOCUMENTS

| | | | |
|---|---|---|---|
| 8,794,277 B2 * | 8/2014 | Hayashi | .............. B60C 11/0302 152/209.11 |
| 2006/0000534 A1 | 1/2006 | Matsunaga | |
| 2013/0014869 A1 * | 1/2013 | Makioka | ............. B60C 11/0302 152/209.11 |

FOREIGN PATENT DOCUMENTS

| | | | |
|---|---|---|---|
| JP | 2001-039120 | * | 2/2001 |
| WO | WO2011/118186 | * | 9/2011 |

OTHER PUBLICATIONS

English machine translation of JP2001-039120, dated Feb. 2001.*

* cited by examiner

*Primary Examiner* — Steven D Maki
*Assistant Examiner* — Robert Dye
(74) *Attorney, Agent, or Firm* — Birch, Stewart, Kolasch & Birch, LLP

(57) ABSTRACT

A motorcycle tire comprises a tread portion provided with first T-grooves and second T-grooves arranged and oriented alternately along the tire equator. The angles of the main portion and branch portion of the T-groove, with respect to the tire circumferential direction, are gradually increased toward the tread edges. The axial distances of the branching point and an inside end of the main portion are not more than 25% of the axial distance of the tread edge, each measured from the tire equator along the tread surface. The circumferential distance from the inside end of the main portion to the circumferentially adjacent T-groove is 5 to 15% of the circumferential pitch length of the first T-grooves.

5 Claims, 7 Drawing Sheets

MOTORCYCLE TIRE

BACKGROUND OF THE INVENTION

The present invention relates to a pneumatic tire, more particularly to a motorcycle tire suitably used on well-paved roads and having a tread pattern mainly formed by oblique grooves by which transient characteristics from the vertical state during straight running to the full lean state during cornering can be improved while preventing the occurrence of shimmy such as handle shimmy during straight running.

In a motorcycle tire used on well-paved roads, it is effectual for improving the cornering performance to relatively increase the rigidity of the tread portion in its central portion so as to generate a large lateral force when a rider initiates a turn and leans into the turn, and thereby to improve the handle response.

In such a motorcycle tire however, during straight running, a relatively large lateral force is liable to occur, therefore, due to the lateral force, shimmy such as handle shimmy is liable to occur.

On the other hand, it is preferable for making stable cornering to gradually and smoothly increase the lateral force of the tire from the vertical state during straight running to the full lean state during cornering.

However, in the above-mentioned motorcycle tire whose tread central portion is relatively increased in the rigidity, it is difficult to further increase the lateral force from the vertical state to the lean state with the increase in the camber angle. And transient characteristics are liable to deteriorate.

SUMMARY OF THE INVENTION

It is therefore, an object of the present invention to provide a motorcycle tire, in which transient characteristics when making a turn from straight running can be improved, while preventing the occurrence of shimmy such as handle shimmy during straight running.

According to the present invention, a motorcycle tire comprises a tread portion provided with first T-grooves and second T-grooves arranged and oriented alternately along the tire equator, the first and second T-grooves each composed of a main portion extending from one side to the other side of the tire equator toward a tread edge, while gradually increasing its angle with respect to the tire circumferential direction, and a branch portion extending from a branching point between both ends of the main portion, while inclining to the opposite direction to the main portion and gradually increasing its angle with respect to the tire circumferential direction, wherein when measured along a tread surface of the tread portion, an axial distance L2 from the tire equator to the branching point and an axial distance L1 from the tire equator to an inside end of the main portion are not more than 25% of an axial distance from the tire equator to a tread edge, and the circumferential distance from said inside end of the main portion to the circumferentially adjacent T-groove is in a range of not less than 5% and not more than 15% of a circumferential pitch length of the first T-grooves or the second T-grooves.

The main portions and branch portions of the first and second T-grooves have outside ends closer to the tread edges and inside ends closer to the tire equator, and the angles of the main portions and branch portions with respect to the tire circumferential direction are gradually increased from the inside ends to the outside ends. As a result, the lateral force is gradually increased with the increase in the camber angle, and transient characteristics and the cornering performance can be improved.

As the branch portion communicates with the main portion, the drainage performance is improved.

As the axial distances L1 and L2 are limited in a specific range, the T-grooves relatively decrease the rigidity of the tread portion in its center zone, and the T-grooves can control the lateral force liable to occur during straight running. Thus, shimmy such as handle shimmy can be prevented. Further, it makes sure that the lateral force gradually increases with the increase in the camber angle and the transient characteristics are further improved.

As the circumferential distance is specifically limited in relation to the circumferential pitch length, the rigidity of the tread portion is relatively decreased in the tread center zone, and the occurrence of shimmy such as handle shimmy can be effectively prevented, and the transient characteristics can be further improved.

The motorcycle tire according to the present invention may be provided with the following features (I)-(V).

(I) each of the first T-grooves and the second T-grooves has only one groove junction which is a T-shaped junction between the main portion and the branch portion;

(II) the tire equator is located between the branching point and the inside end of the main portion of each said first T-groove;

(III) the tire equator is located between the branching point and the inside end of the main portion of each said second T-groove;

(Iv) the axial distance L1 is less than the axial distance L2;

(V) the tread portion is provided on each side of the tire equator with alternate major areas and minor areas defined between the main portions and the branch portions of the first T-grooves and the second T-grooves, and each of the major areas is provided with at least one sub groove extending independently within the major area, while inclining to the same direction as the circumferentially adjacent main portion and branch portion.

In this application including specification and claims, various dimensions, positions and the like of the tire refer to those under a normally inflated unloaded condition of the tire unless otherwise noted.

The normally inflated unloaded condition is such that the tire is mounted on a standard wheel rim and inflate to a standard pressure but loaded with no tire load.

The undermentioned normally inflated loaded condition is such that the tire is mounted on the standard wheel rim and inflated to the standard pressure and loaded with the standard tire load.

The standard wheel rim is a wheel rim officially approved or recommended for the tire by standards organizations, i.e. JATMA (Japan and Asia), T&RA (North America), ETRTO (Europe), TRAA (Australia), STRO (Scandinavia), ALAPA (Latin America), ITTAC (India) and the like which are effective in the area where the tire is manufactured, sold or used. The standard pressure and the standard tire load are the maximum air pressure and the maximum tire load for the tire specified by the same organization in the Air-pressure/Maximum-load Table or similar list. For example, the standard wheel rim is the "standard rim" specified in JATMA, the "Measuring Rim" in ETRTO, the "Design Rim" in TRA or the like. The standard pressure is the "maximum air pressure" in JATMA, the "Inflation Pressure" in ETRTO, the maximum pressure given in the "Tire Load Limits at Various Cold Inflation Pressures" table in TRA or the like. The standard load is the "maximum load capacity" in JATMA, the "Load Capacity" in ETRTO, the maximum value given in the above-mentioned table in TRA or the like.

The angle of a groove or a groove portion can be defined by the angle of the widthwise center line thereof.

To be exact, the branching point can be defined by an intersecting point between the widthwise center line of the main portion and the widthwise center line of the branch portion.

DESCRIPTION OF THE PREFERRED EMBODIMENTS

Figure 1:
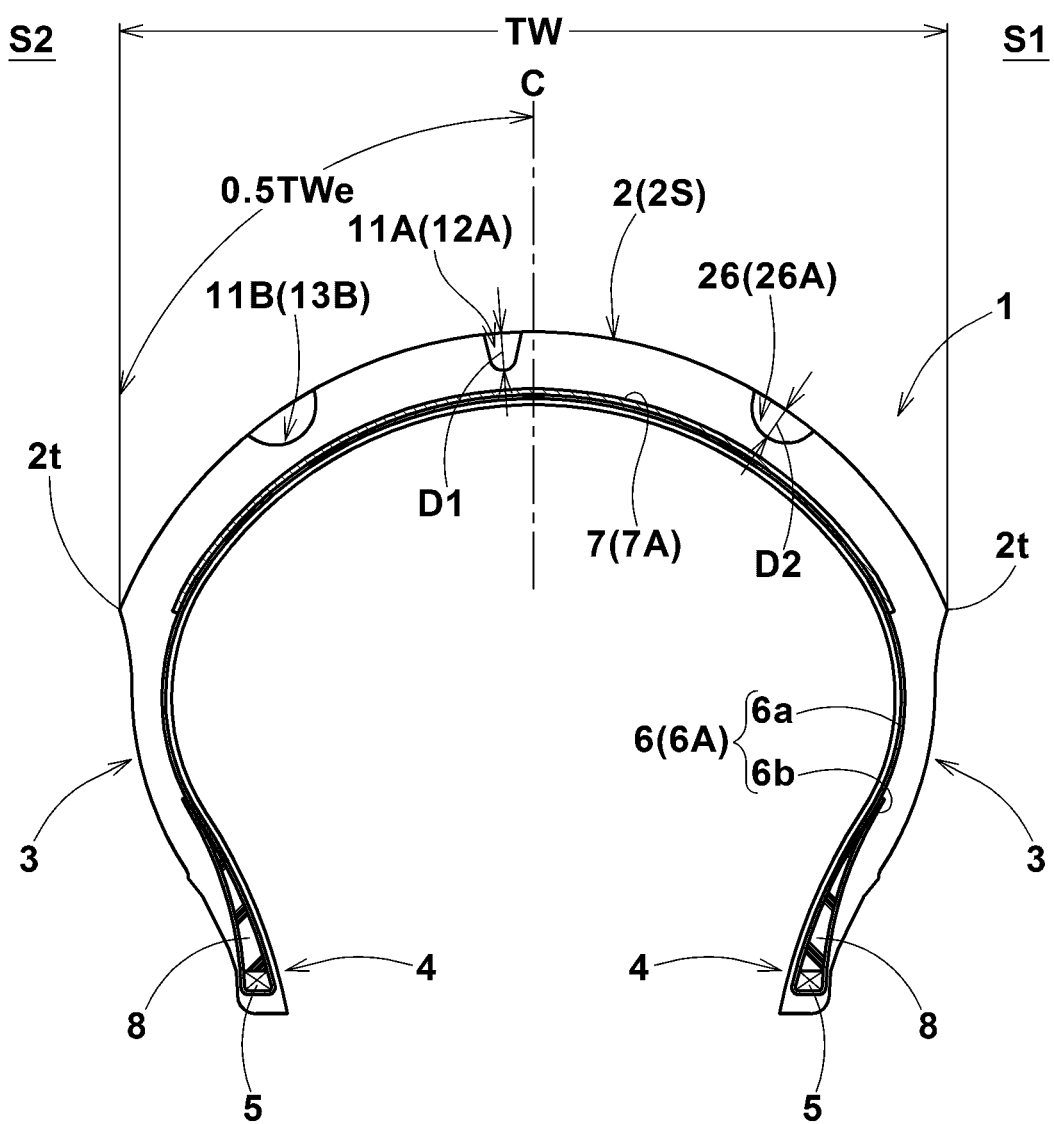
FIG. 1 is a cross sectional view of a motorcycle tire as an embodiment of the present invention taken along line A-A of FIG. 2.

Embodiments of the present invention will now be described in detail in conjunction with the accompanying drawings.

In the drawings, motorcycle tire 1 according to the present invention comprises a tread portion 2, a pair of axially spaced bead portions 4 each with a bead core 5 therein, a pair of sidewall portions 3 extending between the tread edges 2t and the bead portions 4, a carcass 6 extending between the bead portions 4 through the tread portion 2 and sidewall portions 3, and a belt 7 disposed radially outside the carcass 6 in the tread portion 2.

The tread portion 2 (inclusive of the carcass 6, belt 7 and a tread rubber thereon) and tread surface are curved with a relatively small radius of curvature when compared with the passenger car tires, truck/bus tires and the like in order to secure a large ground contacting area during cornering. As a result, the maximum cross section width TW of the tire lies between the tread edges 2t.

The carcass 6 is composed of at least one ply 6A of cords arranged at an angle in the range of from 25 to 90 degrees with respect to the tire equator c, extending between the bead portions 4 through the tread portion 2 and sidewall portions 3 and turned up around the bead core 5 in each bead portion 4 from the axially inside to the axially outside of the tire to form a pair of turnup portions 6b and a main portion 6a therebetween. In this embodiment, the carcass 6 is composed of a single ply 6A of cords arranged radially at an angle of 90 degrees with respect to the tire equator C. For the carcass cords, organic fiber cords, e.g. nylon, polyester, rayon and the like are suitably used.

The bead portions 4 are each provided between the main portion 6a and turned up portion 6b of the carcass ply 6A with a bead apex 8.

The belt 7 is composed of a single jointless ply 7A made of windings of a single rubber coated cord or plural rubber coated parallel cords spirally wound with a cord angle of not more than 10 degrees with respect to the tire circumferential direction. For the belt cord, organic fiber cords, e.g. aramid, nylon, polyester, rayon and the like are suitably used.

In order to improve the enveloping performance by allowing a partial deformation of the tread portion, the tread portion 2 in this embodiment is not provided with cut breaker plies (cross plies) made of rubberized cords laid at a relatively large angle with respect to the tire circumferential direction.

In this embodiment, the motorcycle tire 1 is designed to be used on well paved roads.

The tread portion 2 is provided with a unidirectional tread pattern comprising first T-grooves 11A and second T-grooves 11B which are alternately arranged and oriented along the tire equator C without communicating with each other.

The T-grooves 11A and 11B have groove depths D1 of about 4.0 to 6.0 mm, and groove widths W1 of about 3.5 to 5.5 mm excepting tapered groove end portions.

The first T-groove 11A is made up of a main portion 12A and a branch portion 13A. The second T-groove 11B is made up of a main portion 12B and a branch portion 13B.

In the first T-groove 11A, the main portion 12A extends obliquely from one side (right side) S1 to the other side (left side) S2 of the tire equator C, and the branch portion 13A extends from a branching point 14A between both ends 12Ai and 12Ao of the main portion 12A, while inclining to a direction opposite to the inclining direction of the main portion 12A.

In the second T-grooves 11B, the main portion 12B extends obliquely from the other side (left side) S2 to one side (right side) S1 of the tire equator C, and the branch portion 13B extends from a branching point 14B between both ends 12Bi and 12Bo of the main portion 12B, while inclining to a direction opposite to the inclining direction of the main portion 12B.

The first T-grooves 11A is provided with only one groove junction 15A (T-shaped) between the main portion 12A and the branch portion 13A. The second T-grooves 11B is provided with only one groove junction 15B (T-shaped) between the main portion 12B and the branch portion 13B.

Therefore, it is possible to generate an effective lateral force during cornering so as to improve the cornering stability.

If a T-groove 11A, 11B has a plurality of groove junctions, the rigidity of the tread portion 2 is liable to excessively decrease and the cornering stability is deteriorated.

Figure 3:
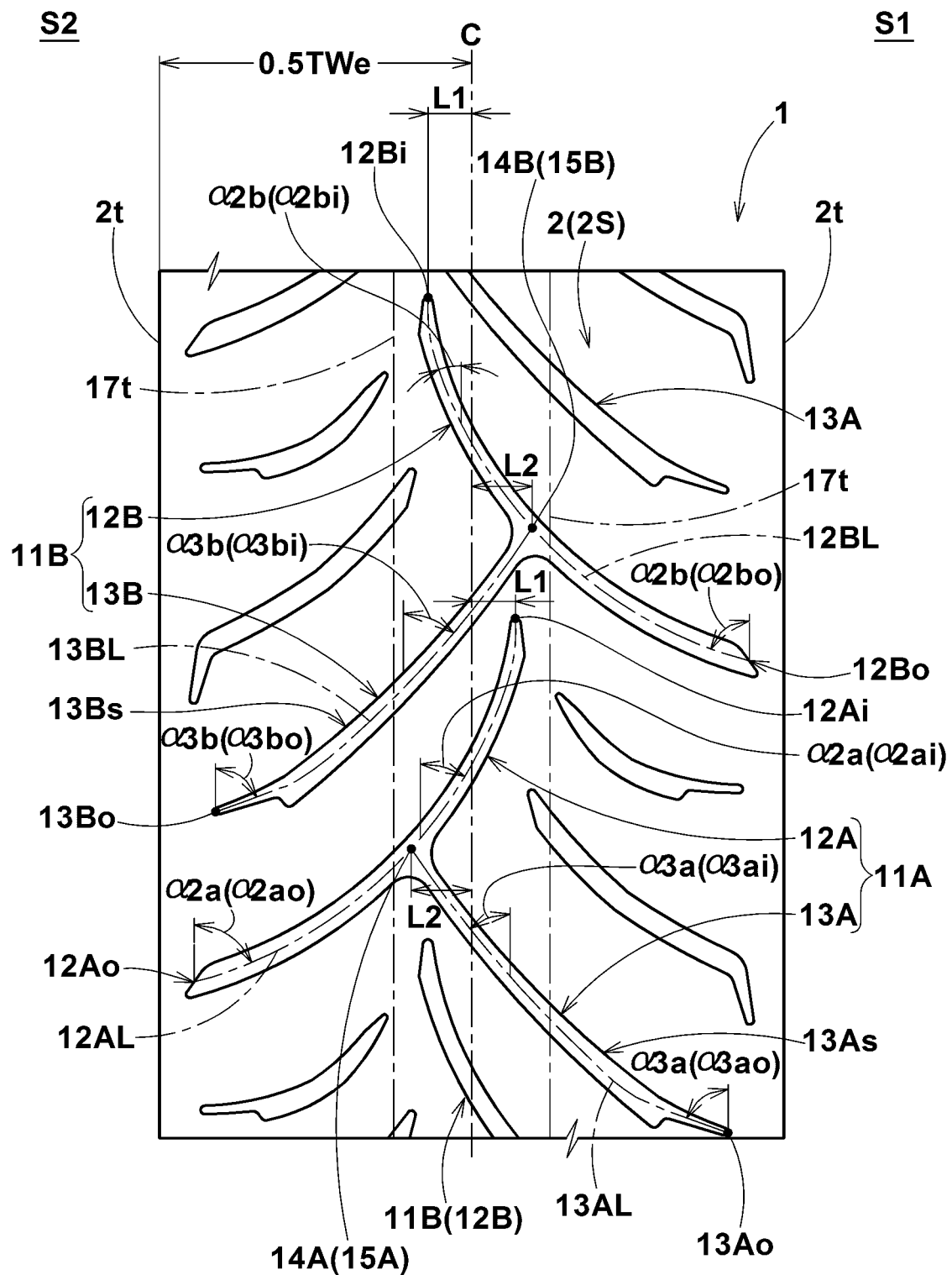

As shown in FIG. 3, the angle $\alpha 2a$, $\alpha 2b$ of the main portion 12A, 12B with respect to the tire circumferential direction is gradually increased from its inside end 12Ai, 12Bi on the tire equator side to its outside end 12Ao, 12Bo on the tread edge side in order to smoothen the drainage of water and in order to gradually increase the lateral force with the increase in the camber angle from straight running (camber angle=zero) and thereby to improve the transient characteristics.

In a tread center zone between the ground contact edges 17t during straight running, the above-mentioned angle $\alpha 2a$, $\alpha 2b$ (hereinafter "$\alpha 2ai$, $\alpha 2bi$") is preferably set in a range of not less than 5 degrees, more preferably not less than 10 degrees, but not more than 30 degrees, more preferably not more than 25 degrees.

The ground contact edges 17t are the axial outermost edges of the ground contacting patch of the tire (when camber angle=0) in the above-mentioned normally inflated loaded condition.

If the angle $\alpha 2ai$, $\alpha 2bi$ is less than 5 degrees, the lateral rigidity of the tread portion 2 is decreased in the tread center zone, and it becomes difficult to generate a sufficient lateral force at the time of making a turn from straight running, and the transient characteristics can not be fully improved. Further, there is a possibility that the drainage can not be fully improved. If the angle $\alpha 2ai$, $\alpha 2bi$ exceeds 30 degrees, a large lateral force is liable to occur during straight running, and there is a possibility that shimmy such as handle shimmy is caused.

At the outside end 12Ao, 12Bo of the main portion 12A, 12B, the above-mentioned angle $\alpha 2a$, $\alpha 2b$ (hereinafter, "$\alpha 2ao$, $\alpha 2bo$") is preferably set in a range of not less than 50 degrees, more preferably not less than 55 degrees, but not more than 80 degrees, more preferably not more than 70 degrees.

If the angle α2ao, α2bo becomes less than 50 degrees, it becomes difficult to generate a lateral force required for full lean cornering, and the transient characteristics can not be fully improved. If the angle α2ao, α2bo exceeds 80 degrees, the lateral force at full lean cornering excessively increases, and the transient characteristics can not be fully improved.

Both end portions of the main portion 12A, 12B are tapered toward the inside ends 12Ai, 12Bi and outside ends 12Ao, 12Bo to smoothen the tread rigidity change and improve the transient characteristics.

The angle α3a, α3b of the branch portion 13A, 13B with respect to the tire circumferential direction is gradually increased from the branching point 14A, 14B to its outside end 13Ao, 13Bo on the tread edge side in order to smoothen the drainage of water and in order to gradually increase the lateral force with the increase in the camber angle from straight running (camber angle=zero) and thereby to improve the transient characteristics.

In the above-mentioned tread center zone between the ground contact edges 17t during straight running, the above-mentioned angle α3a, α3b (hereinafter, "α3ai, α3bi") is preferably set in a range of not less than 5 degrees, more preferably not less than 10 degrees, but not more than 30 degrees, more preferably not more than 25 degrees.

At the outside end 13Ao, 13Bo of the branch portion 13A, 13B, the above-mentioned angle α3a, α3b (hereinafter, "α3ao, α3bo') is preferably set in a range of not less than 50 degrees, more preferably not less than 55 degrees, but not more than 80 degrees, more preferably not more than 70 degrees.

The outside end part of the branch portion 13A, 13B is tapered toward the outside end 13Ao, 13Bo in order to smoothen the tread rigidity change and to improve the transient characteristics.

The branch portion 13A, 13B has a first groove edge 13As, 13Bs on the inside end 12Ai, 12Bi side and a second groove edge on the outside end 12Ao, 12Bo side, wherein the entire length of the first groove edge 13As, 13Bs extends along a smoothly curved line, but this is not for the second groove edge.

In the branch portion 13A, 13B, its groove with has a stepwise difference between the tapered outside end part (narrow) and its almost entire part (wide) excluding the tapered outside end part. In the almost entire part of the branch portion 13A, 13B, the second groove edge extends along a smoothly curved line almost parallel with the first groove edge 13As, 13Bs.

When measured along the tread surface 2s, the axial distance L1 from the tire equator C to the inside ends 12Ai, 12Bi of the main portion 12A, 12B and the axial distance L2 from the tire equator C to the branching point 14A, 14B are set to be not more than 25%, preferably not more than 20% of the axial distance (0.5 TWe) between the tire equator c and one of the tread edges 2t in order to relatively decrease the tread rigidity in a tread center zone and thereby to prevent the occurrence of a large lateral force during straight running. Therefore, the occurrence of shimmy such as handle shimmy can be prevented, and the lateral force is gradually increased with the increase in the camber angle from straight running and thereby the transient characteristics can be improved.

Further, in order that the axial positions of the inside ends 12Ai, 12Bi do not coincide with those of the branching points 14A, 14B, the axial distance L1 is preferably less than the axial distance L2. For example, the distance L1 is not more than 0.8 times, preferably not more than 0.7 times the distance L2. Therefore, a local excessive decrease in the tread rigidity and the resultant deterioration in the transient characteristics can be prevented.

As to a positional relationship in the tire axial direction, it is preferable that the tire equator C is located between the branching point 14A, 14B and the inside end 12Ai, 12Bi of the main portion 12A, 12B.

Figure 4:
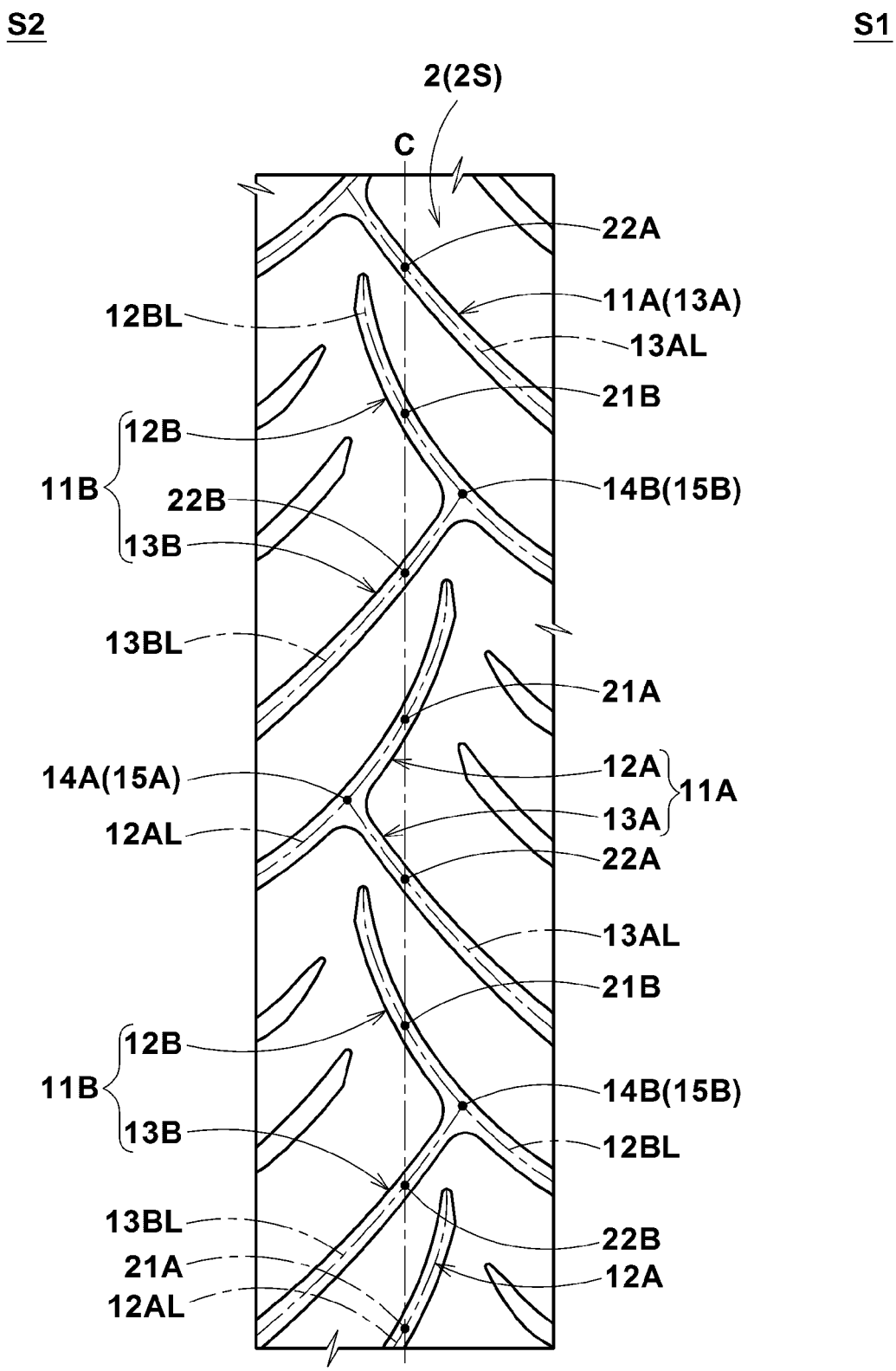

Thus, as shown in FIG. 4, the tire equator C is crossed by the first T-grooves 11A and the second T-grooves 11B alternately, and each of the T-grooves crosses the tire equator C twice by its main portion and branch portion, defining two intersecting points (21A and 22A), (21B and 22B) as shown.

Therefore, in the vicinity of the tire equator C, the rigidity of the tread portion 2 is decreased to effectively prevent shimmy such as handle shimmy during straight running.

Further, the lateral force is gradually increased with the increase in the camber angle from straight running and thereby the transient characteristics can be improved.

Figure 2:
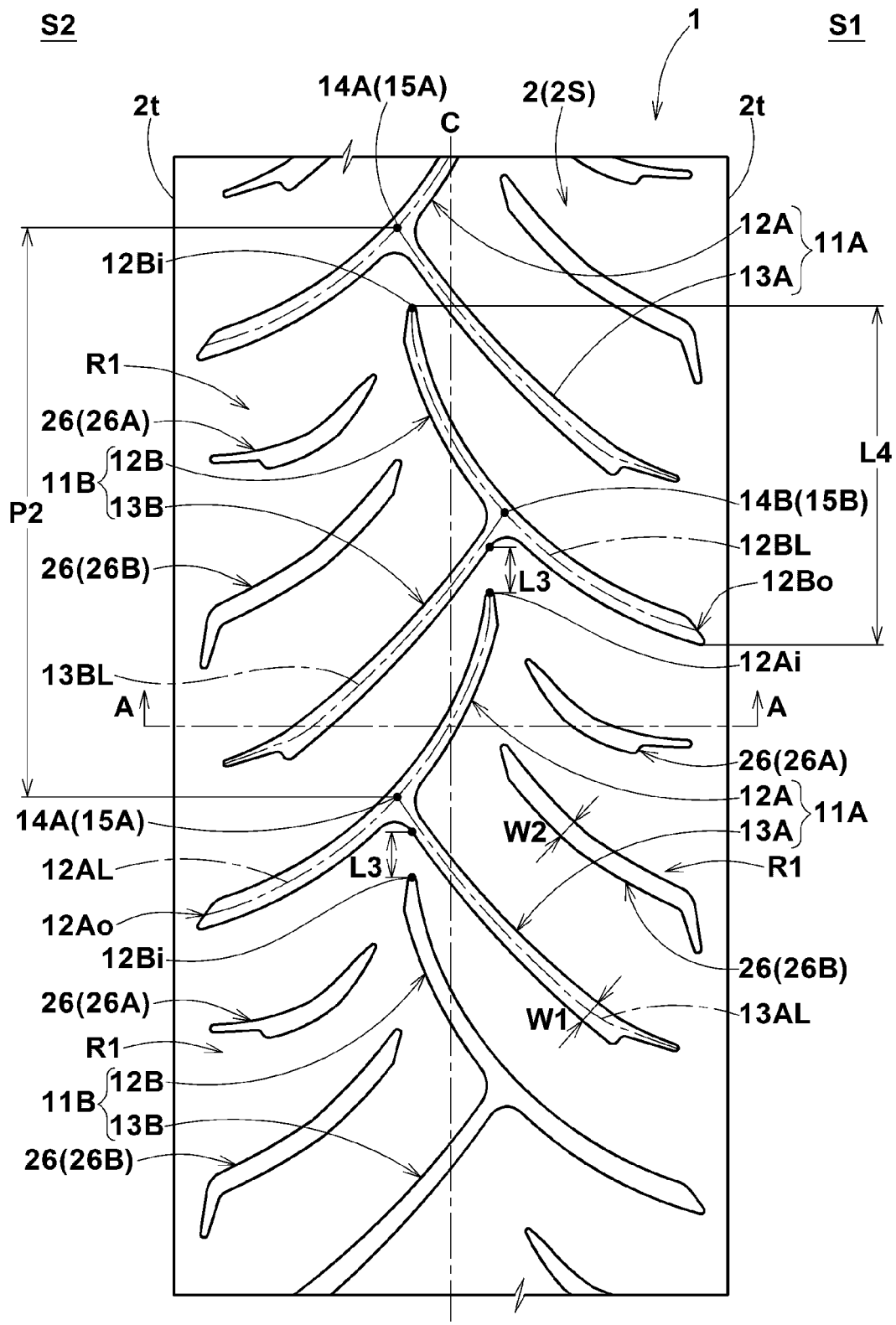
FIGS. 2, 3, 4 and 5 are developed partial plan views of the motorcycle tire showing an example of the tread pattern.

The circumferential distance L3 from the inside end 12Ai, 12Bi of the main portion 12A, 12B to the circumferentially adjacent T-groove 11A, 11B is set in a range of not less than 5%, preferably not less than 8%, but not more than 15%, preferably not more than 12% of the circumferential pitch length P2 of the first T-grooves 11A (or the second T-grooves 11B) as shown in FIG. 2. The circumferential pitch length P2 of the first T-grooves 11A is the same as that of the second T-grooves 11B.

Incidentally, the pitch length P2 can be defined, for example, between the branching points 14A of the circumferentially adjacent first T-grooves 11A or between the branching points 14B of the circumferentially adjacent second T-grooves 11B; further between the ends 12Bi and 12Bi or between the ends 12Bo and 12Bo; or between the ends 12Ai and 12Ai or between the ends 12Ao and 12Ao; or the like.

Therefore, the tread rigidity is relatively decreased in a tread center zone and thereby shimmy such as handle shimmy can be effectively prevented, and the transient characteristics can be effectively improved.

If the distance L3 exceeds 15% of the pitch length P2, there is a possibility that the above-mentioned advantageous effect can not be obtained. If the distance L3 is less than 5% of the pitch length P2, there is a possibility that the tread rigidity is excessively decreased in a tread central area and the transient characteristics is deteriorated.

Further, the length L4 of the main portion 12A, 12B measured in the tire circumferential direction as shown in FIG. 2 is preferably set in a range of not less than 50%, more preferably not less than 55%, but not more than 70%, more preferably not more than 65% of the pitch length P2 in order that the first T-grooves 11A overlap with the second T-grooves 11B in the tire circumferential direction and thereby the pattern rigidity becomes uniform in the tire circumferential direction. Therefore, the ride comfort can be improved while preventing the shimmy.

If the length L4 of the main portion 12A, 12B is less than 50% of the pitch length P2, it becomes difficult to obtain the above-mentioned advantageous effect. If the length L4 exceeds 70% of the pitch length P2, the circumferential pattern rigidity is excessively decreased, and there is a possibility that the transient characteristics is deteriorated.

On each side of the tire equator C, the tread portion 2 is provided with circumferentially alternate major areas R1 and minor areas defined between the main portions and the branch portions of the first and second T-grooves (namely, between 12A and 13B or between 12B and 13A).

In this embodiment, the tread portion 2 is further provided between every two circumferentially adjacent first T-groove 11A and second T-groove 11B with at least one, in this example two sub grooves 26. More specifically, the above-mentioned at least one groove 26 is disposed in each of the major areas R1 on each side of the tire equator C.
In this embodiment, no groove is formed in the minor areas.

The above-mentioned at least one groove 26 in this example is a first sub groove 26A extending independently in a main portion side, and a second sub groove 26B extending independently in a branch portion side, and the first and second sub grooves 26A and 26B are inclined to the same direction as the circumferentially adjacent main portion and branch portion.

The sub grooves 26 have groove depths D2 (shown in FIG. 1) of from 4.0 to 6.0 mm, and groove widths W2 of from about 3.5 to 5.5 mm excepting the tapered groove end portions.
The first and second sub grooves 26A and 26B decrease the tread rigidity in the major areas R1 and balance the tread rigidity between the right side and left side of the tire equator, and the transient characteristics and ride comfort can be improved.

Figure 5:
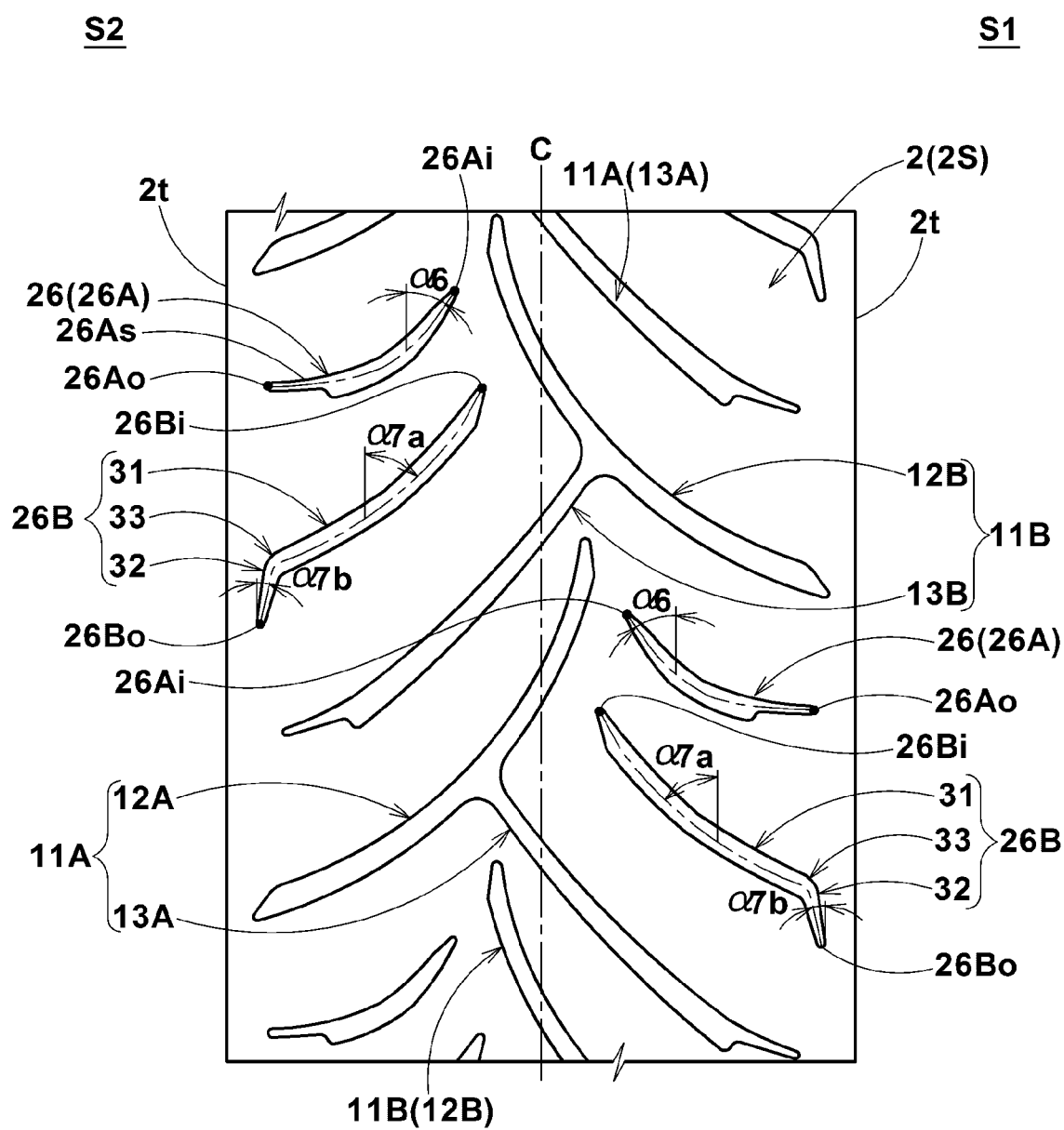
Figure 6:
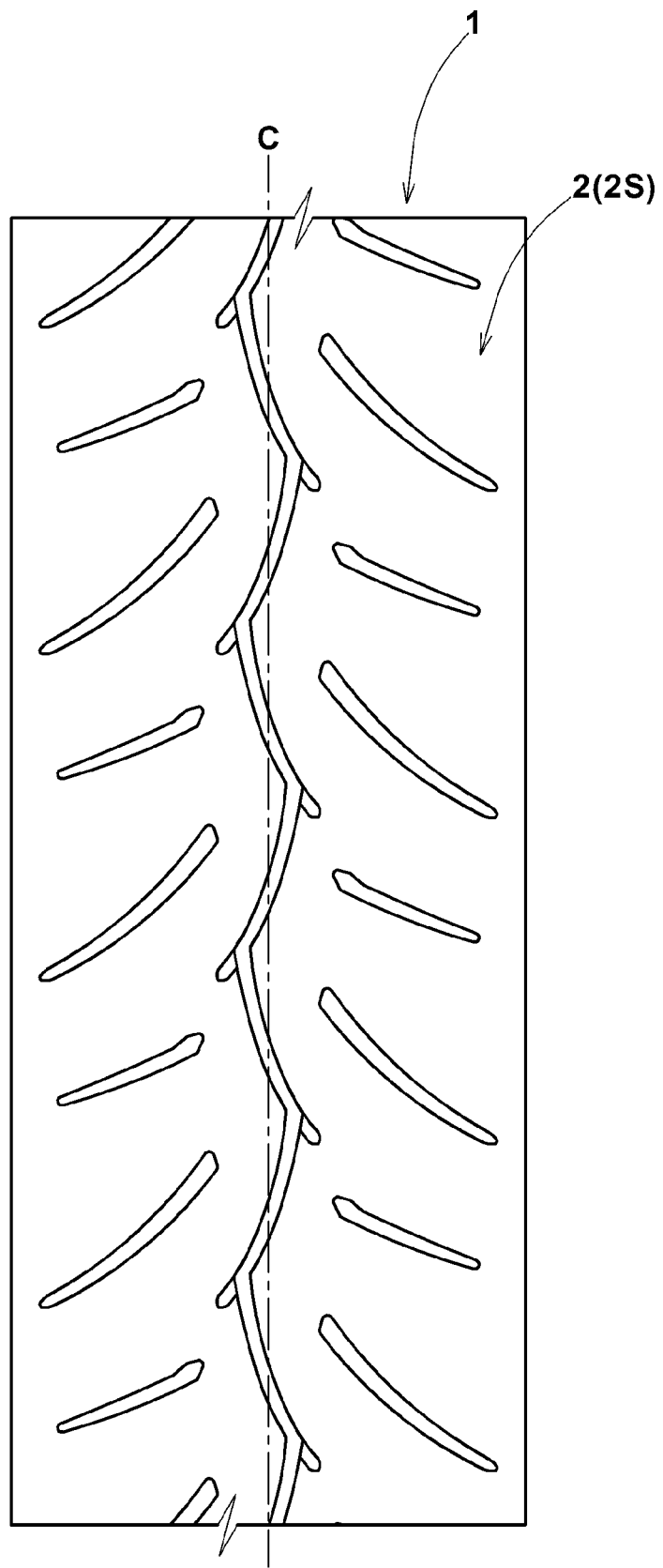
FIG. 6 and FIG. 7 show tread patterns of comparative example tires.
Figure 7:
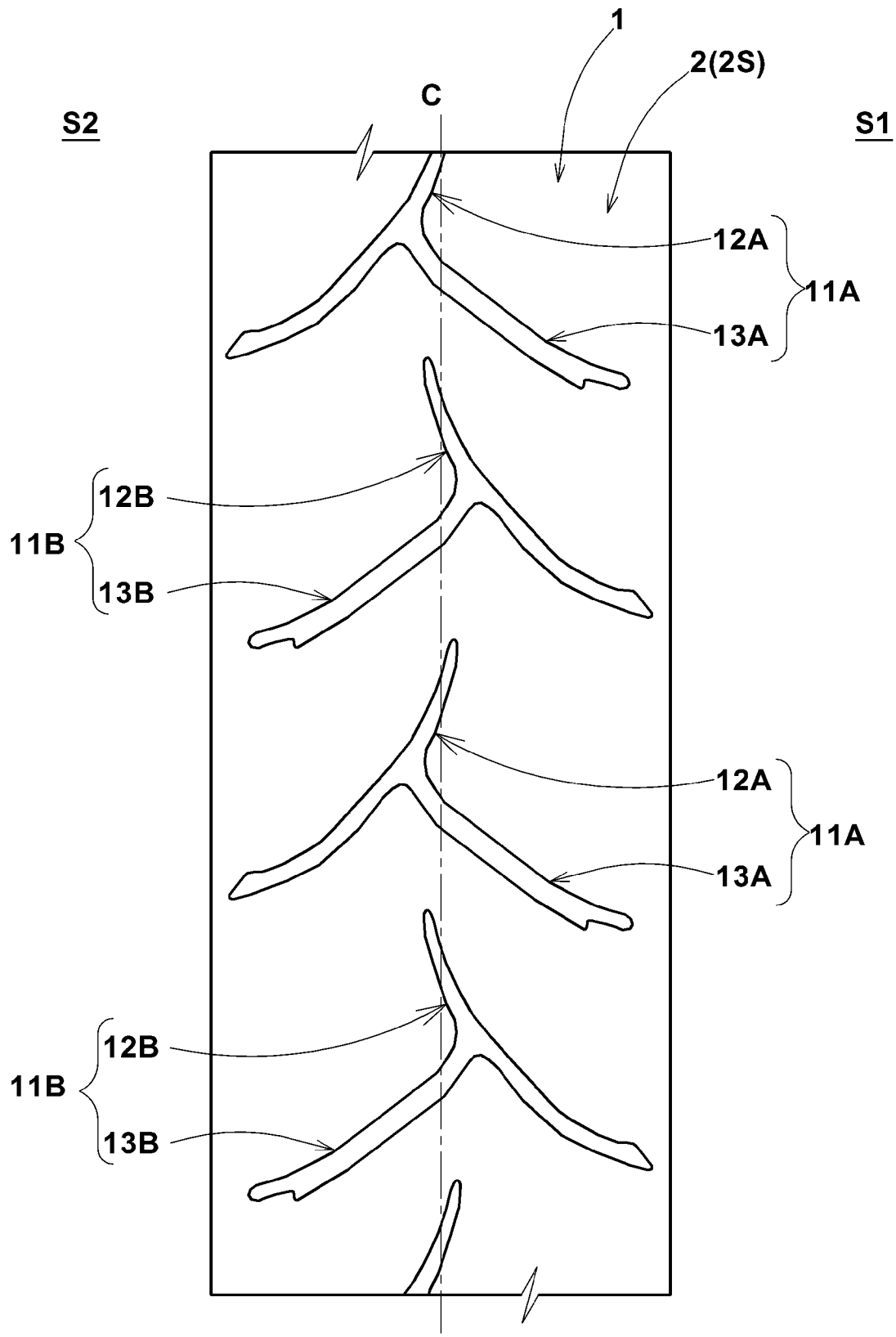

As shown in FIG. 5, the angle α6 of the first sub grooves 26A with respect to the tire circumferential direction is gradually increased from its axially inner end 26Ai toward its axially outer end 26Ao in order to gradually increase the lateral force with the increase in the camber angle from straight running (camber angle=zero) and thereby to improve the transient characteristics and the cornering performance. Preferably, the angle α6 is set in a range of 20 to 85 degrees.

The axially inner end part and axially outer end part of the first sub groove 26A are tapered toward its axially inner end 26Ai and axially outer end 26Ao, respectively, in order to smoothen the tread rigidity change and improve the transient characteristics.

The first sub groove 26A has a first groove edge 26As on the main portion 12A/12B side and a second groove edge on the branch portion 13B/13A side. The entire length of the first groove edge 26As extends along a smoothly curved line. The width of the first sub groove 26A has a stepwise difference between the tapered outside end part (narrow) and its main part (wide) excluding both the tapered end parts. In the main part, the second groove edge extends along a smoothly curved line almost parallel with the first groove edge 26As.

The second sub groove 26B has a substantially L-shaped configuration having a bent point 33 and is composed of a main portion 31 extending from the axially inner end 26Bi of the second sub groove 26B towards the tread edge 2t to the bent point 33, while gradually increasing its angle α7a with respect to the tire circumferential direction, and an outer portion 32 extending from the bent point 33 toward the axially outer end 26Bo of the second sub groove 26B, while gradually decreasing its angle α7b with respect to the tire circumferential direction.

Preferably, the angle α7a is in a range of from about 20 to 80 degrees, and the angle α7b is in a range of from about 10 to 40 degrees.

Therefore, owing to the main portion 31, the lateral force gradually increases with the increase in the camber angle from straight running (camber angle=zero) and the transient characteristics and the cornering performance can be improved. Further, owing to the outer portion 32, the drainage during cornering can be improved.

An axially inner end portion and axially outer end portion of the second sub groove 26B are tapered toward its axially inner end 26Bi and outer end 26Bo, respectively, in order to smoothen the tread rigidity change and improve the transient characteristics.

Comparison Tests

Based on the tread pattern shown in FIG. 2 and the structure shown in FIG. 1, motorcycle tires having specifications shown in Table 1 were experimentally manufactured and tested.
Common Specifications are as Follows:
Tire Size:
  front: 110/90-13 (rim size: 13×MT2.75)
  rear: 140/70-13 (rim size: 13×MT4.00)
Distance (0.5 TWe): 55 mm
T-Grooves:
  width W1: 4.5 mm (max)
  depth D1: 5.0 mm (max)
  pitch length P2: 163 mm
First Sub Groove:
  angle α6: 20-85 degrees
Second Sub Groove:
  angle α7a: 20-80 degrees
  angle α7b: 10-40 degrees
In the test, the test tires were installed on a 250 cc motorcycle, and evaluated by a test rider regarding shimmy such as handle shimmy and transient characteristics during running on a dry asphalt road surface in a tire test course.
(front tire pressure 175 kPa, rear tire pressure 175 kPa)

The test results are indicated in Table 1 by an index based on comparative example tire Ref.1 being 100, wherein the larger the value, the better the performance.

From the test results, it was confirmed that the motorcycle tires according to the present invention can be improved in the transient characteristics, while preventing the occurrence of shimmy during straight running.

TABLE 1

| Tire | Ref. 1 | Ex. 1 | Ex. 2 | Ref. 2 | Ex. 3 | Ref. 3 | Ex. 4 | Ex. 5 |
|---|---|---|---|---|---|---|---|---|
| tread pattern (Fig. No.) | 6 | 1 | 1 | 1 | 1 | 1 | 1 | 1 |
| L1 (mm) | — | 3.9 | 11.0 | 16.5 | 13.8 | 3.9 | 3.9 | 3.9 |
| L2 (mm) | — | 7.2 | 13.8 | 16.5 | 13.8 | 7.2 | 7.2 | 7.2 |
| L1/0.5TWe (%) | — | 7 | 20 | 30 | 25 | 7 | 7 | 7 |
| L2/0.5TWe (%) | — | 13 | 25 | 30 | 25 | 18 | 18 | 18 |
| L1/L2(times) | — | 0.5 | 0.8 | 1.0 | 1.0 | 0.5 | 0.5 | 0.5 |
| L3 (mm) | — | 12 | 10 | 14 | 10 | 3 | 8 | 25 |
| L3/P2 (%) | — | 7 | 6 | 8 | 6 | 2 | 5 | 15 |
| L4 (mm) | — | 95 | 95 | 106 | 95 | 114 | 109 | 92 |
| L4/P2 (%) | — | 58 | 58 | 65 | 58 | 70 | 67 | 56 |
| angle α2ai, α2bi (deg.) | — | 5-25 | 5-25 | 5-25 | 5-25 | 5-25 | 5-25 | 5-25 |
| angle α2ao, α2bo (deg.) | — | 70 | 70 | 70 | 70 | 70 | 70 | 70 |
| angle α3ao, α3bo (deg.) | — | 65 | 65 | 65 | 65 | 55 | 55 | 55 |
| shimmy | 100 | 120 | 110 | 70 | 105 | 120 | 120 | 100 |
| transient characteristics | 100 | 120 | 110 | 80 | 105 | 80 | 110 | 105 |

TABLE 1-continued

| Tire | Ref. 4 | Ref. 5 | Ex. 6 | Ex. 7 | Ex. 8 | Ex. 9 | Ex. 10 | Ex. 11 |
|---|---|---|---|---|---|---|---|---|
| tread pattern (Fig. No.) | 1 | 7 | 1 | 1 | 1 | 1 | 1 | 1 |
| L1 (mm) | 3.9 | 3.9 | 3.9 | 3.9 | 3.9 | 3.9 | 3.9 | 3.9 |
| L2 (mm) | 7.2 | 7.2 | 7.2 | 7.2 | 7.2 | 7.2 | 7.2 | 7.2 |
| L1/0.5TWe (%) | 7 | 7 | 7 | 7 | 7 | 7 | 7 | 7 |
| L2/0.5TWe (%) | 18 | 18 | 18 | 18 | 18 | 18 | 18 | 18 |
| L1/L2(times) | 0.5 | 0.5 | 0.5 | 0.5 | 0.5 | 0.5 | 0.5 | 0.5 |
| L3 (mm) | 39 | 39 | 12 | 12 | 12 | 12 | 12 | 12 |
| L3/P2 (%) | 24 | 24 | 7 | 7 | 7 | 7 | 7 | 7 |
| L4 (mm) | 78 | 78 | 82 | 114 | 95 | 95 | 95 | 95 |
| L4/P2 (%) | 47 | 47 | 50 | 70 | 58 | 58 | 58 | 58 |
| angle α2ai, α2bi (deg.) | 5-30 | 5-30 | 5-25 | 5-25 | 0-25 | 5-30 | 5-25 | 5-25 |
| angle α2ao, α2bo (deg.) | 70 | 70 | 70 | 70 | 70 | 70 | 50 | 80 |
| angle α3ao, α3bo (deg.) | 55 | 55 | 55 | 65 | 65 | 65 | 50 | 80 |
| shimmy | 70 | 70 | 110 | 120 | 120 | 110 | 120 | 120 |
| transient characteristics | 90 | 90 | 100 | 110 | 90 | 110 | 100 | 110 |

The invention claimed is:

1. A motorcycle tire comprising:
a tread portion provided with first T-grooves and second T-grooves arranged and oriented alternately along the tire equator,
the first and second T-grooves each composed of
a main portion extending from one side to the other side of the tire equator toward a tread edge, while gradually increasing its angle with respect to the tire circumferential direction, and
a branch portion extending from a branching point between both ends of the main portion, while inclining to the opposite direction to the main portion and gradually increasing its angle with respect to the tire circumferential direction,
wherein
when measured along a tread surface of the tread portion, an axial distance L2 from the tire equator to the branching point and an axial distance L1 from the tire equator to an inside end of the main portion are not more than 25% of an axial distance from the tire equator to a tread edge of the tread portion, and
the circumferential distance from said inside end of the main portion to the circumferentially adjacent T-groove is in a range of not less than 5% and not more than 15% of a circumferential pitch length of the first T-grooves,
each of the first T-grooves and the second T-grooves having only one groove junction, wherein
said groove junction is a T-shaped junction between the main portion and the branch portion,
the main portion is smoothly curved along its entire length without an inflection point, and
the branch portion is smoothly curved along its entire length without an inflection point,
the tread portion provided on each side of the tire equator with alternate major areas and minor areas defined between the main portions and the branch portions of the first T-grooves and the second T-grooves,
wherein
each of the minor areas is provided with no groove, and
each of the major areas is provided with a sub groove extending independently within the major area, while inclining to the same direction as the circumferentially adjacent main portion and branch portion.

2. The motorcycle tire according to claim 1, wherein the tire equator is located between the branching point and the inside end of the main portion of each said first T-groove.

3. The motorcycle tire according to claim 1, wherein the tire equator is located between the branching point and the inside end of the main portion of each said second T-groove.

4. The motorcycle tire according to claim 1, wherein the axial distance L1 is less than the axial distance L2.

5. The motorcycle tire according to claim 1, wherein
each of the major areas is provided with an additional sub groove extending independently within the major area, the additional sub groove having a substantially L-shaped configuration having a bent point and being composed of
a main portion extending axially outwardly from the axially inner end of the additional sub groove to the bent point, while inclining to the same direction as the circumferentially adjacent main portion and branch portion, and
an axially outer portion extending from the bent point toward the axially outer end of the additional sub groove, while inclining in a direction different from the main portion.

* * * * *